US009140187B2

(12) United States Patent
Ribarov et al.

(10) Patent No.: US 9,140,187 B2
(45) Date of Patent: Sep. 22, 2015

(54) MAGNETIC DE-ICING

(71) Applicant: United Technologies Corporation, Hartford, CT (US)

(72) Inventors: Lubomir A. Ribarov, West Hartford, CT (US); Jacek F. Gieras, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 532 days.

(21) Appl. No.: 13/646,456

(22) Filed: Oct. 5, 2012

(65) Prior Publication Data

US 2014/0096503 A1   Apr. 10, 2014

(51) Int. Cl.
*F02C 7/047* (2006.01)
*H05B 6/10* (2006.01)

(52) U.S. Cl.
CPC ............... *F02C 7/047* (2013.01); *H05B 6/109* (2013.01); *H05B 2214/02* (2013.01)

(58) Field of Classification Search
CPC ..... B64F 5/0054; B64F 5/0072; B64D 15/00; B64D 15/12; B64D 15/14; B64D 15/16; B64D 15/163; B64D 15/20; B64D 15/22; B64D 2033/0233; F02C 7/047
See application file for complete search history.

(56) References Cited

U.S. PATENT DOCUMENTS

| 4,060,212 | A | 11/1977 | Magenheim |
| 5,061,826 | A | 10/1991 | MacCulloch et al. |
| 5,131,812 | A | 7/1992 | Boyd et al. |
| 5,746,580 | A * | 5/1998 | Parker et al. ............. 416/245 R |
| 5,793,137 | A * | 8/1998 | Smith ............................ 310/114 |
| 7,105,105 | B2 | 9/2006 | Samuels et al. |
| 7,258,526 | B2 | 8/2007 | Dooley et al. |
| 7,714,479 | B2 * | 5/2010 | Seneff et al. ................. 310/268 |
| 8,033,789 | B2 | 10/2011 | Read et al. |
| 2011/0024567 | A1 | 2/2011 | Blackwelder et al. |
| 2011/0025157 | A1 * | 2/2011 | Blackwelder et al. ........ 310/115 |

FOREIGN PATENT DOCUMENTS

| GB | 625299 | 6/1949 |
| GB | 629764 | 9/1949 |

OTHER PUBLICATIONS

Klaus Halbach, Design of Permanent Multipole Magnets with Oriented Rare Earth Cobalt Materials, Nuclear Instruments and Methods, Feb. 1, 1980, pp. 1-10, University of California, Berkeley, CA.

* cited by examiner

*Primary Examiner* — Craig Kim

(74) *Attorney, Agent, or Firm* — Bachman & LaPointe, P.C.

(57) ABSTRACT

An apparatus has a first member having an exposed peripheral surface and an electrically and thermally conductive portion. A circumferential array of magnets of alternating polarity are mounted for rotation about an axis relative to the first member inboard of the peripheral surface, the magnets being in sufficient proximity to the electrically and thermally conductive portions so that the rotation of the magnets about the axis is effective to generate eddy currents, in turn, is effective to heat the electrically and thermally conductive portion and, thereby, heat the exposed peripheral surface.

19 Claims, 10 Drawing Sheets

MAGNETIC DE-ICING

BACKGROUND

The disclosure relates to de-icing. More particularly, the disclosure relates to de-icing of turbomachines.

Icing of aircraft external rotating components during adverse ambient flight conditions is a well-known aerodynamic problem. A cutaway of a modern advanced twin spool turbofan engine is shown in FIG. 1. The large cone-shaped hub 70 ("spinner"; although known as a "nose cone" or "inlet cone" it is rarely actually conical but, instead typically has a longitudinally convex profile diverging rearward) at the base of the fan blades 34 is one particular area subject to icing.

Many anti-ice approaches have been developed in the past including both on-ground treatments and in-flight anti-icing. Some of the most widely used methods for de-icing the nose cone are either based on electrical resistive heating or using hot pressurized air bleed from a predetermined compressor stage of the engine. Resistive heating requires complex wiring, control logic, and current draw. Bleed heating involves a direct parasitic loss adversely affecting the thermodynamic performance of the engine and is, hence, undesirable.

In separate fields, permanent magnet arrays have been used in magnetic motors and generators. They have also been used in mechanical couplings. One proposed coupling is seen in U.S. patent application Ser. No. 13/344,697, filed Jan. 6, 2012, and entitled "Magnetically Coupled Contra-Rotating Propulsion Stages". However, these are not configured to keep an exposed surface de-iced.

SUMMARY

One aspect of the disclosure involves an apparatus has a first member having an exposed peripheral surface and an electrically and thermally conductive portion. A circumferential array of magnets of alternating polarity are mounted for rotation about an axis relative to the first member inboard of the peripheral surface, the magnets being in sufficient proximity to the electrically and thermally conductive portions so that the rotation of the magnets about the axis is effective to generate eddy currents, in turn, is effective to heat the electrically and thermally conductive portion and, thereby, heat the exposed peripheral surface.

In additional or alternative embodiments of any of the foregoing embodiments, the array is not a portion of an electric motor, electric generator, or magnetic coupling.

In additional or alternative embodiments of any of the foregoing embodiments, the array comprises at least 10 cycles of a repeating pattern.

In additional or alternative embodiments of any of the foregoing embodiments, the array is counterrotationally coupled to the first member via a transmission.

In additional or alternative embodiments of any of the foregoing embodiments, the array is a Malinson-Halbach array.

In additional or alternative embodiments of any of the foregoing embodiments, the array comprises a repeating pattern of: a first magnet of north-outward polarity; a second magnet of north-clockwise polarity; a third magnet of north-inward polarity; and a fourth magnet of north-counterclockwise polarity.

In additional or alternative embodiments of any of the foregoing embodiments, the array surrounds and is non-rotationally mounted to a non-ferromagnetic ring.

In additional or alternative embodiments of any of the foregoing embodiments, the array comprises a repeating pattern of: a first magnet of north-outward polarity; and a second magnet of north-inward polarity.

In additional or alternative embodiments of any of the foregoing embodiments, the array surrounds and is non-rotationally mounted to a ferromagnetic ring.

In additional or alternative embodiments of any of the foregoing embodiments, the ferromagnetic ring has a radial thickness of at least 3 mm.

In additional or alternative embodiments of the foregoing embodiments, the first member electrically and thermally conductive portion comprises, circumscribing the array: a steel ring; and a conductive non-ferromagnetic ring inboard of the steel ring.

In additional or alternative embodiments of any of the foregoing embodiments, the steel ring has a radial thickness of at least 3 mm.

In additional or alternative embodiments of any of the foregoing embodiments, there are a plurality of said circumferential arrays, with a longitudinally-varying diameter.

In additional or alternative embodiments of any of the foregoing embodiments, the apparatus is a turbomachine wherein an air flowpath passes over the peripheral surface.

In additional or alternative embodiments of any of the foregoing embodiments, the peripheral surface is along a nose cone or inlet cone.

In additional or alternative embodiments of any of the foregoing embodiments, the apparatus is a turbine engine wherein: the first member comprises an engine case and a nose cone or an inlet cone; and the first exposed peripheral surface is of then nose cone or the inlet cone.

In additional or alternative embodiments of any of the foregoing embodiments, the first member electrically and thermally conductive portion comprises at least one metallic ring mounted along an inner surface of the nose cone or the inlet cone In additional or alternative embodiments of any of the foregoing embodiments, the turbine engine is a turbofan engine comprising: a core flowpath through the engine case; a fan having a circumferential array of fan blades; and a fan case encircling the fan blades radially outboard of the engine case.

In additional or alternative embodiments of any of the foregoing embodiments, the peripheral surface is along a nose cone or an inlet cone of the fan.

Another aspect of the disclosure involves a method for operating an apparatus. The apparatus comprises: a first member having an exposed peripheral surface; and a circumferential array of magnets of alternating polarity mounted to rotate relative to the first member inboard of the peripheral surface. The method comprises: driving rotation of the array member about the axis relative to the first member, the driving effective to cause the array to magnetically heat the peripheral surface; and passing an airflow over the peripheral surface.

In additional or alternative embodiments of any of the foregoing embodiments, the magnetic heating of the peripheral surface is effective to prevent icing on the peripheral surface.

In additional or alternative embodiments of any of the foregoing embodiments, the magnetic heating of the peripheral surface is effective to melt ice on the peripheral surface.

In additional or alternative embodiments of any of the foregoing embodiments: the apparatus is a turbine engine; and the driving comprises running the turbine engine to also cause the airflow.

The details of one or more embodiments are set forth in the accompanying drawings and the description below. Other

BRIEF DESCRIPTION OF THE DRAWINGS

Like reference numbers and designations in the various drawings indicate like elements.

DETAILED DESCRIPTION

Figure 1:
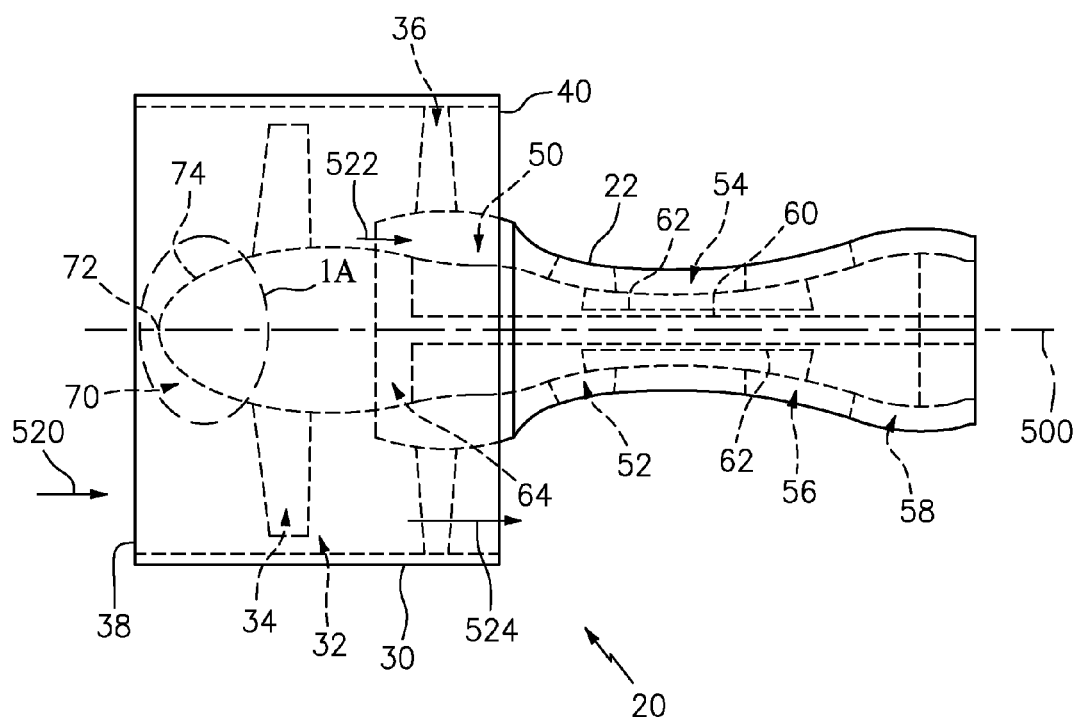
FIG. 1 is a partially schematic longitudinal view of a gas turbine engine.

FIG. 1 shows a turbofan engine 20 having a main housing (engine case) 22. The engine has a centerline or central longitudinal axis 500.

The exemplary engine is a high-bypass ducted turbofan wherein a duct (fan case) 30 surrounds a fan section 32 comprising a circumferential array of fan blades 34. The fan case may be supported relative to the engine case 22 via a plurality of struts 36. The duct may extend the full length of the engine in some engine applications.

In operation, an inlet air flow 520 enters an inlet of the fan case formed by a forward end/rim 38. The inlet flow passes through the fan stage and is divided into a core flow 522 which passes along a core flowpath through the engine case 22 and a bypass flow 524 which passes along a bypass flowpath, exiting an outlet formed by an aft rim 40 of the fan case. The term "bypass ratio" (BPR) commonly used in aviation is defined as the ratio of the mass flow rate of air drawn by the fan which bypasses the engine core to the mass flow of air passing through the engine core. This core air flow is used in combustion to provide the mechanical energy needed to turn the turbines. A low BPR indicates nearly equal amounts of air bypassing the engine core and entering the engine core. Along the core flowpath, the air flow passes sequentially through one or more compressor stages, a combustor, and one or more turbine stages. Each of the stages may include interspersed arrays of rotating blades and stationary vanes although other configurations are possible.

In the exemplary engine, there are two compressor sections and two turbine sections. From upstream-to-downstream, the core flow passes through a low pressure compressor (LPC) section 50, a high pressure compressor (HPC) section 52, the combustor 54, a high pressure turbine (HPT) section 56, and a low pressure turbine (LPT) section 58. In this example, the low pressure turbine section drives the low pressure compressor section via a shaft 60 (low pressure shaft). The high pressure turbine section drives the high pressure compressor section via a shaft 62. The fan may be directly driven by the low pressure shaft 60. Alternatively, it may be driven with a speed reduction via a transmission 64 coupling the low pressure shaft to the fan. Exemplary transmissions 64 are epicyclic transmissions.

FIG. 1 also shows the fan as comprising a central nose cone 70 extending aftward to the fan blades 34 from a central tip or nose 72. Acceleration of the air flow 520 over the divergent external/exterior/outer/outboard surface 74 (schematically shown as an actual conical surface in FIG. 1A) of the nose cone 70 can cause aerodynamic cooling which exacerbates icing along the cone's surface. Accordingly a permanent magnet-based system is provided for heating the cone 70.

Figure 1A:
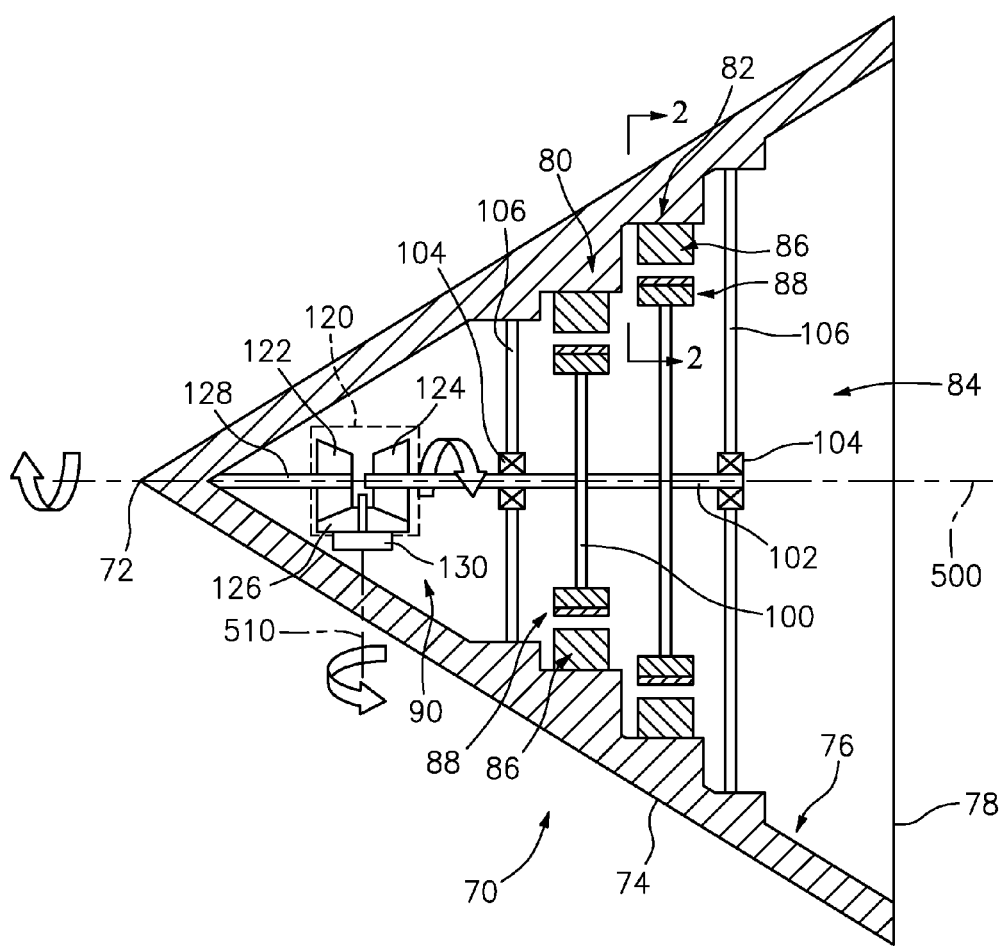
FIG. 1A is an enlarged sectional view of a spinner of the engine of FIG. 1

FIG. 1A shows the nose cone 70 immediately forward of the fan blade array. The exemplary cone may be formed of an aluminum alloy and includes the divergent external surface 74 and an internal surface 76 and extends from the tip 72 to an aft rim 78.

The exemplary cone 70 is shown bearing two stages 80, 82 of a de-icing system 84. Each stage 80, 82 comprises an outer portion (member) 86 mounted to a body of the cone and an inner portion (member) 88 mounted for rotation relative thereto. In the exemplary embodiment, a transmission 90 provides counter-rotation of the inner portion 88 relative to the outer portion 86. Alternative implementations might involve holding the inner portion non-rotating (e.g., coupled to the engine case to not rotate relative thereto).

In one example of operation, it will be assumed the cone rotates clockwise when viewed from the front. The opposite rotation may be possible.

The inner portions 88 are each held axially and radially via an array of struts 100 (or a web) extending radially outward from a shaft 102. The shaft 102 may be supported by bearings 104, in turn, supported by struts or webs 106 extending radially inward from the cone inner surface 76. The exemplary transmission 90 comprises a housing 120 containing an input gear 122, an output gear 124, and one or more coupling gears 126. The output gear 124 is mounted to the shaft 102. The input gear is mounted to an input shaft 128 non-rotationally fixed relative to the cone body.

The gear(s) 126 engage both the input and the output gears and are carried by the housing 120 for rotation about a transverse axis 510. In this example, if the housing 120 is held against rotation relative to the cone, then the clockwise rotation of the cone provides a clockwise rotation of the gear 122. This, in turn, produces a clockwise rotation of gear(s) 126 (when viewed outward from the centerline 500 along the associated axis 510). This, in turn, produces a counter-clockwise rotation of the gear 124 and thus the inner members 88. To maintain orientation of the housing 120, the housing 120 is provided with an off-center weight 130. The weight 130 is heavy enough so that operational forces will tend to not be sufficient to cause continuous rotation of the transmission housing. Rather, in operation, the weight 130 may make slight excursions from a downward orientation to cause gravitational counter-torques. Various provisions may be made for gear lubrication. The housing 120 of the transmission 90 may be sealed and may contain grease or other lubricant. Alternatively, an oiling system may be provided.

Figure 2:
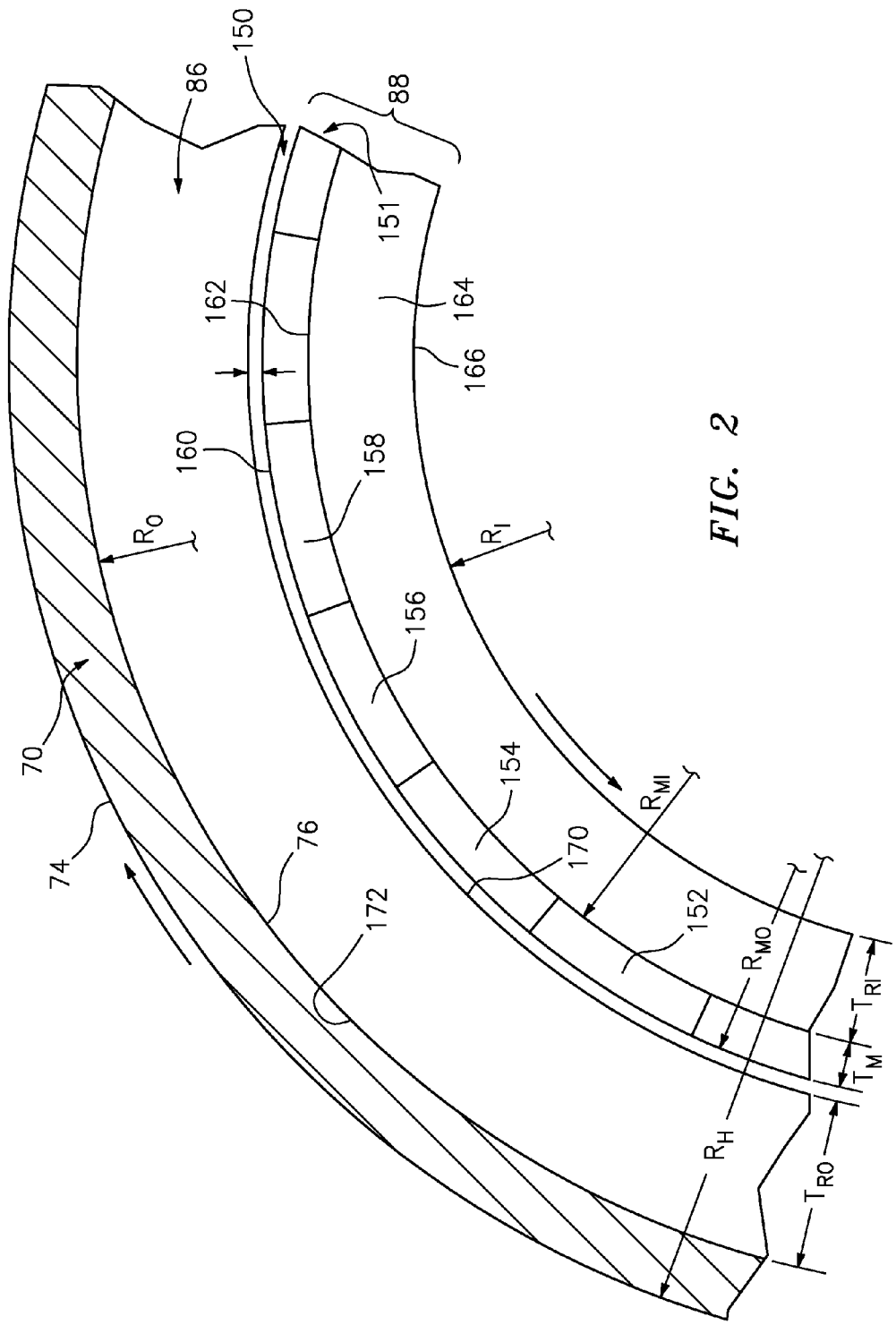
FIG. 2 is a partial front view of a de-icing stage of the engine of FIG. 1.

FIG. 2 shows further details of the outer member 86 and inner member 88. They are shown radially separated by a gap 150. The exemplary inner member comprises a circumferential array 151 of magnets of alternating polarity. In this example, the array is formed of repeating cells of four permanent magnets (PMs) whose polarities are oriented as follows: a first magnet 152 of north-outward polarity; a second magnet 154 of north-clockwise polarity; a third magnet 156 of north-inward polarity; and a fourth magnet 158 of northcounter-clockwise polarity. Thus, each north-outward polarity magnet has two adjacent magnets whose north pole faces away therefrom. This configuration is known as a Mallinson-Halbach array. Each exemplary magnet is thus formed as a sector of an annular sleeve.

The exemplary magnet outboard surfaces combine to form an outboard (outer diameter (OD)) surface 160 of the inner member 88. The exemplary magnet inboard surfaces are mounted to the outboard surface 162 of an inner ring 164 which, in turn, has an inboard (inner diameter (ID)) surface 166.

Figure 3:
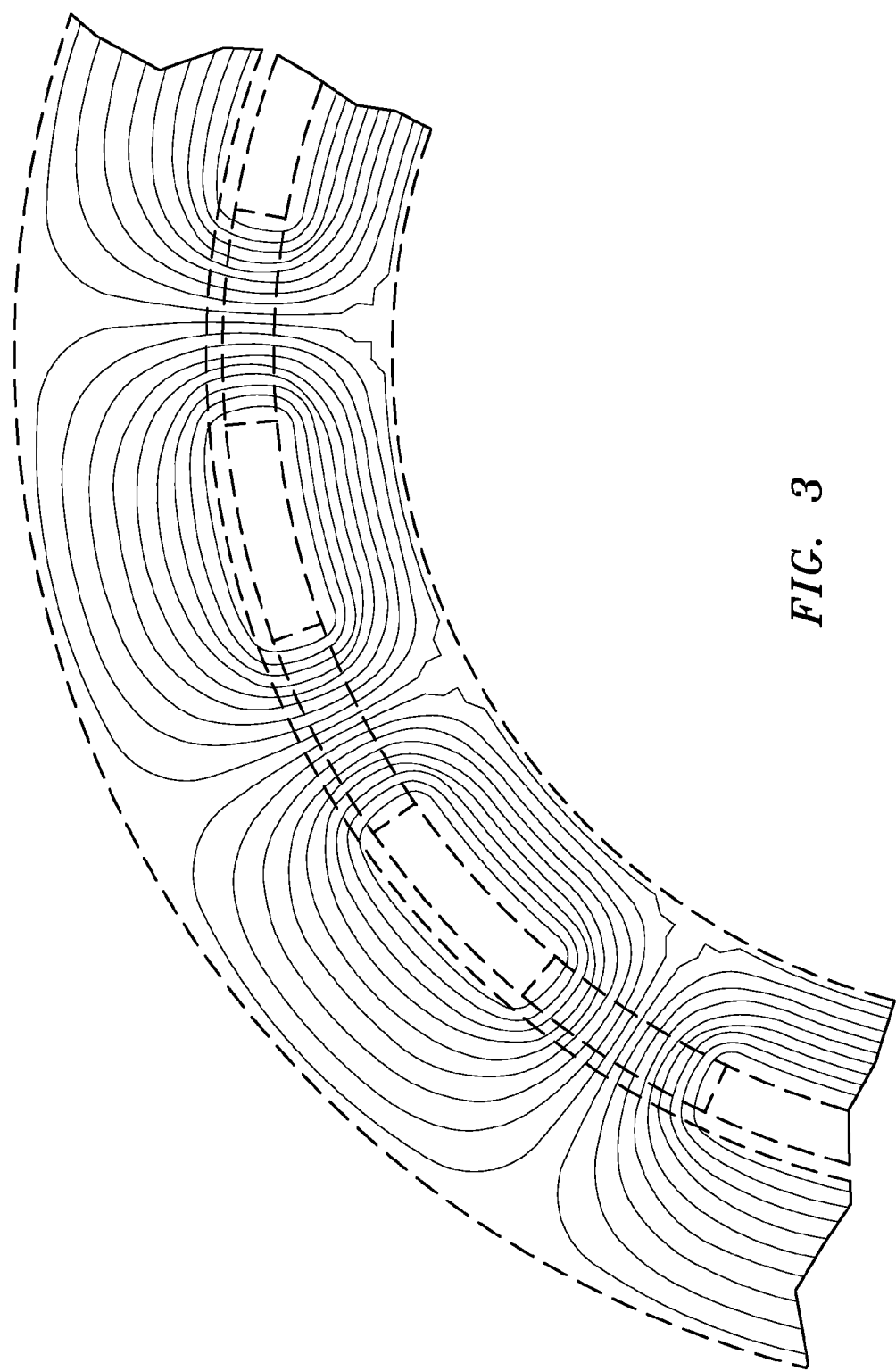
FIG. 3 is a magnetic field simulation of the de-icing stage of FIG. 2.

The exemplary outer member 86 is a high electrical conductivity and thermal conductivity material. It may be a physically continuous (or at least electrically continuous) ring. Exemplary material is a metal such as an aluminum alloy. FIG. 3 shows the ring 86 as having a thickness $T_{RO}$ between an inboard face 170 and an outboard face 172. The exemplary outboard face is in contacting relation to the inboard surface 76 of the cone. In yet alternate examples, the ring 86 may be integrated with the cone. The contacting relationship allows heat transfer from the ring 86 to the cone 70 to heat the surface 74.

When the engine rotates the PM array generates eddy currents in the ring 86. These currents heat the ring 86 which, in turn, heats the inside of the cone and through conduction heat transfer keeps its outer surface 74 above the ambient temperature. This prevents the ice formation or in extreme conditions acts as an effective and efficient de-icing device. The exemplary ring 86 is non-ferromagnetic so as have sufficient electrical conductivity to host (and not repel) the eddy currents and have sufficient thermal conductivity to provide sufficient volume for such currents to heat and transfer heat to any outer member. Thus, the exemplary ring is metallic for eddy current and heat conduction but not ferromagnetic. An exemplary relative magnetic permeability ($\mu_R$) for such non-ferromagnetic material is about one or less (e.g., ≤1.00 or an exemplary 1.000 (for Al which is a paramagnetic material $\mu_R$=1.000022, for Cu which is a diamagnetic material $\mu_R$=0.99999976)).

FIG. 2. shows a 12-pole Mallinson-Halbach array (six cells). For a Mallinson-Halbach arrangement of permanent magnets, the inner ring 164 is non-ferromagnetic. Otherwise, a high leakage flux would decrease the magnetic flux density in the air gap 150 between the array and the ring 86. The exemplary ring 164, however, need not be of high thermal and/or electrical conductivity. The exemplary ring 164, however, functions mostly as a mechanical support for the magnets. The physical properties of the ring 164 will depend upon the inertial or other loading it is required to take. This loading will reflect, for example, any rotational speed of the ring. Exemplary material for the ring 164 is an aluminum alloy or a titanium alloy or a plastic. Aluminum may be used principally for low cost.

Exemplary thickness of the inner ring 164 is shown as $T_{RI}$. FIG. 2 also shows an inner radius at the surface 166 $R_I$ and an outer radius at the surface 172 of $R_O$. Exemplary $T_{RO}$ is 10-12 mm, more broadly 5-15 mm. If thickness is too small the heat generated by the eddy current will be transferred quickly to the cone. Thicker values could be used to act more as a heat sink, possibly facilitating intermittent operation. Exemplary $T_{RI}$ is mostly determined by strength to provide support for the magnets (e.g., 8-10 mm, more broadly 8-12 mm or 5-20 mm for a particular embodiment). Exemplary $T_M$ is 5-7 mm, more broadly 5-10 mm or 4-12 mm.

Exemplary gap thicknesses $T_G$ is minimized, but sufficient to avoid interference due to combinations of vibrations, thermal expansion and centrifugal expansion (e.g., 1-3 mm, more broadly, 3 mm or less, or 0.5-3 mm or 1-2 mm). This may be fairly consistent over a range of likely engine sizes.

When engineering the apparatus, the heat generated in the rotating conductive ring 86 can be influenced by selection of PM material, radial thickness of permanent magnets and number of poles. In such a situation, the radius $R_O$ will be effectively predetermined by the component to be de-iced and the rotational speed will be predetermined based upon anticipated operating parameters. For the fan hub, exemplary radius at the downstream end of the cone is 20-50 cm. Exemplary operating speed is at least 2000 rpm, more particularly, at least 10,000 rpm (e.g., 10,000-20,000 rpm). Exemplary magnet outer radius $R_{MO}$ or magnet inner radius $R_{MI}$ may be at least 85% (more narrowly at least 90%) of hub outer radius $R_H$ (e.g., 85-95%).

FIG. 3 shows the magnetic field associated with operating the apparatus of FIG. 2.

Figure 4:
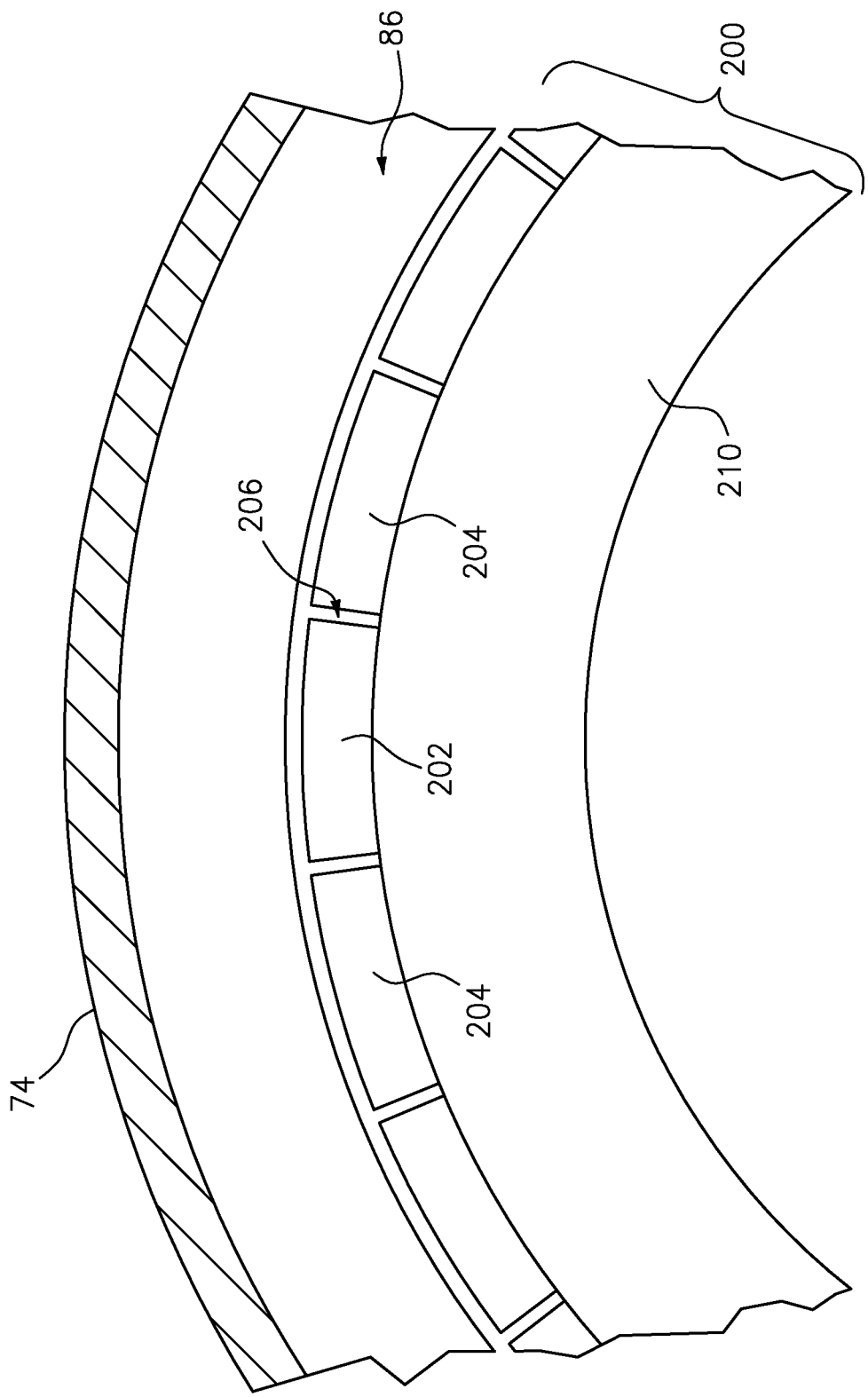
FIG. 4 is a partial front view of an alternative de-icing stage.
Figure 5:
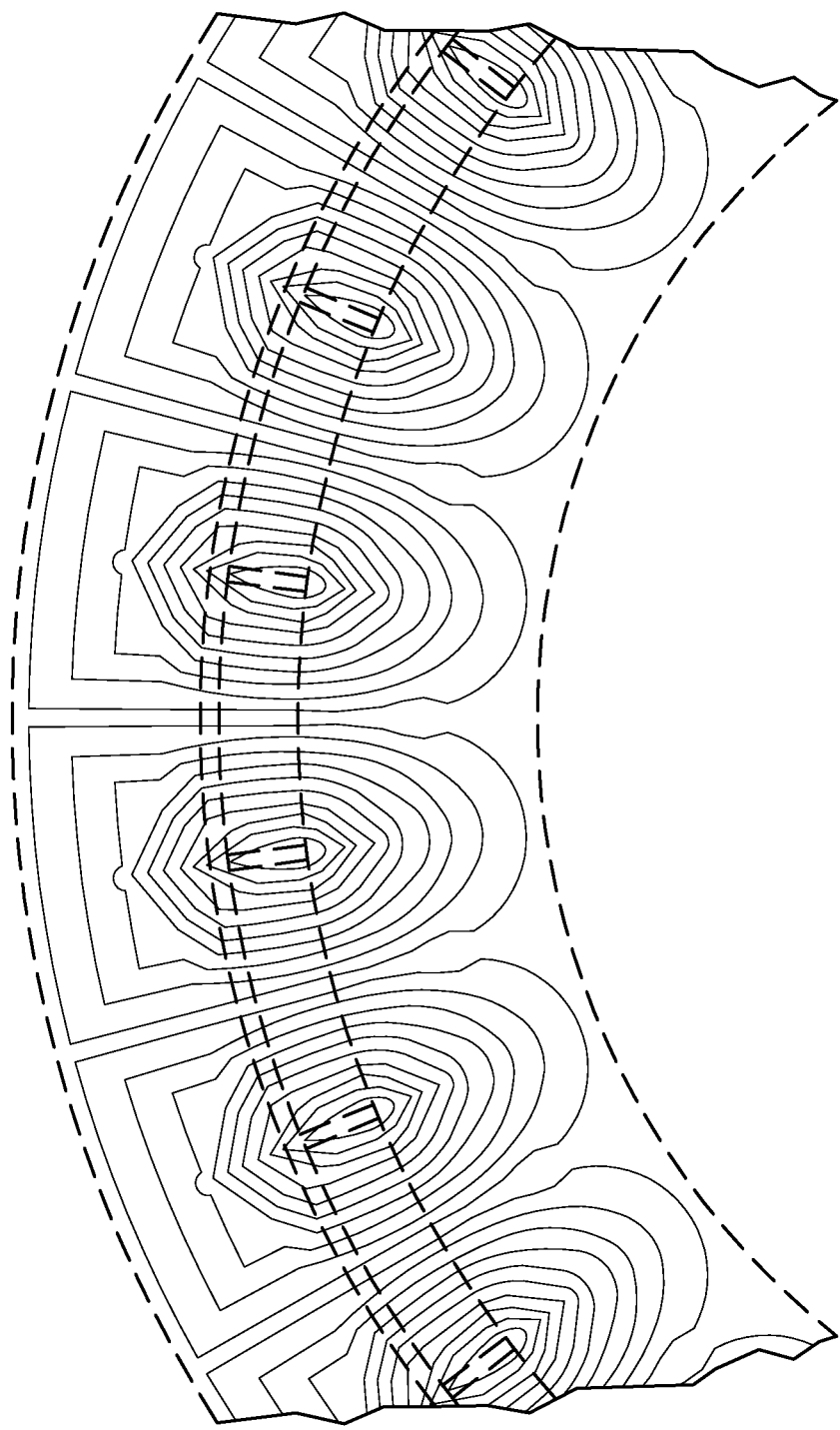
FIG. 5 is a magnetic field simulation of the first alternative de-icing stage.

FIGS. 4 and 5 show another embodiment of a permanent magnet de-icing system. The exemplary inner member 88 is replaced by an inner member 200 having an array of permanent magnets other than a Mallinson-Halbach array. The exemplary array includes a two-member cell formed by first magnets 202 having north-outward polarity and second magnets 204 having north-inward polarity. FIG. 4 shows small inter-magnet circumferential gaps 206. Exemplary gaps are at least about 2 mm in span (e.g., 1-10 mm or 2-8 mm) and serve to reduce leakage flux between the magnets. The exemplary configuration involves a 24-pole excitation system. However, the number of poles may be selected as noted above as part of the optimization for desired heat generation. An exemplary number of the repeating cells is in excess of five, more particularly, an exemplary 6-20.

The inner ring 164 is replaced by a ferromagnetic inner ring 210 (e.g., of carbon steel). The ferromagnetism allows the ring 210 to provide a low reluctance return path for magnetic flux from one magnet to the next. Exemplary $\mu_R$ for the ferromagnetic inner ring 210 is >>1 (more particularly, >100 or >300 or an exemplary several hundred to several thousand). Exemplary thickness of the ring 210 is at least 10 mm, more particularly, 15-30 mm but will depend heavily on target operating parameters. Otherwise, exemplary radial positions and thicknesses of the magnets and rings may be similar to those of the first embodiment.

Figure 6:
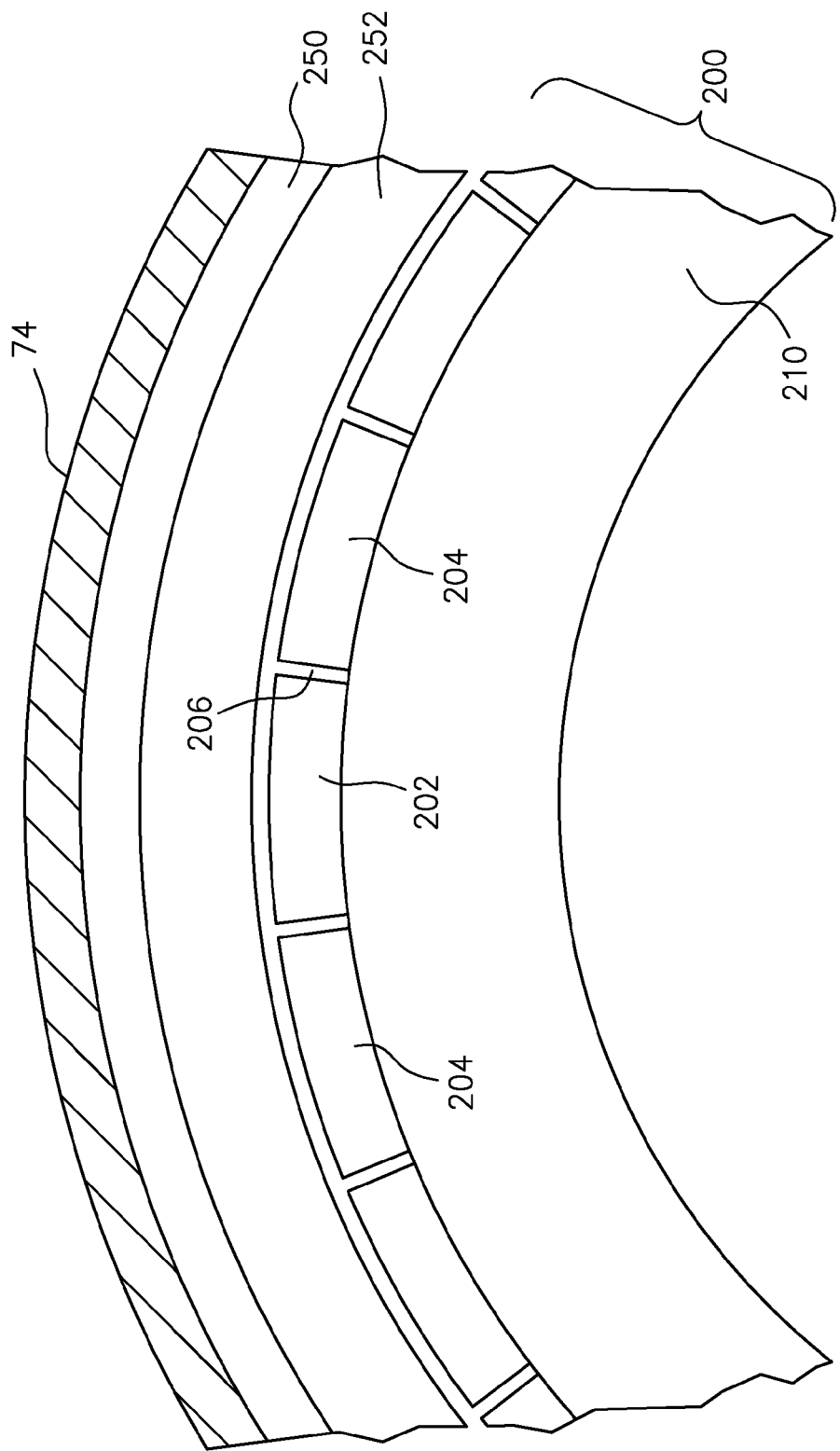
FIG. 6 is a partial front view of a second alternative de-icing stage.
Figure 7:
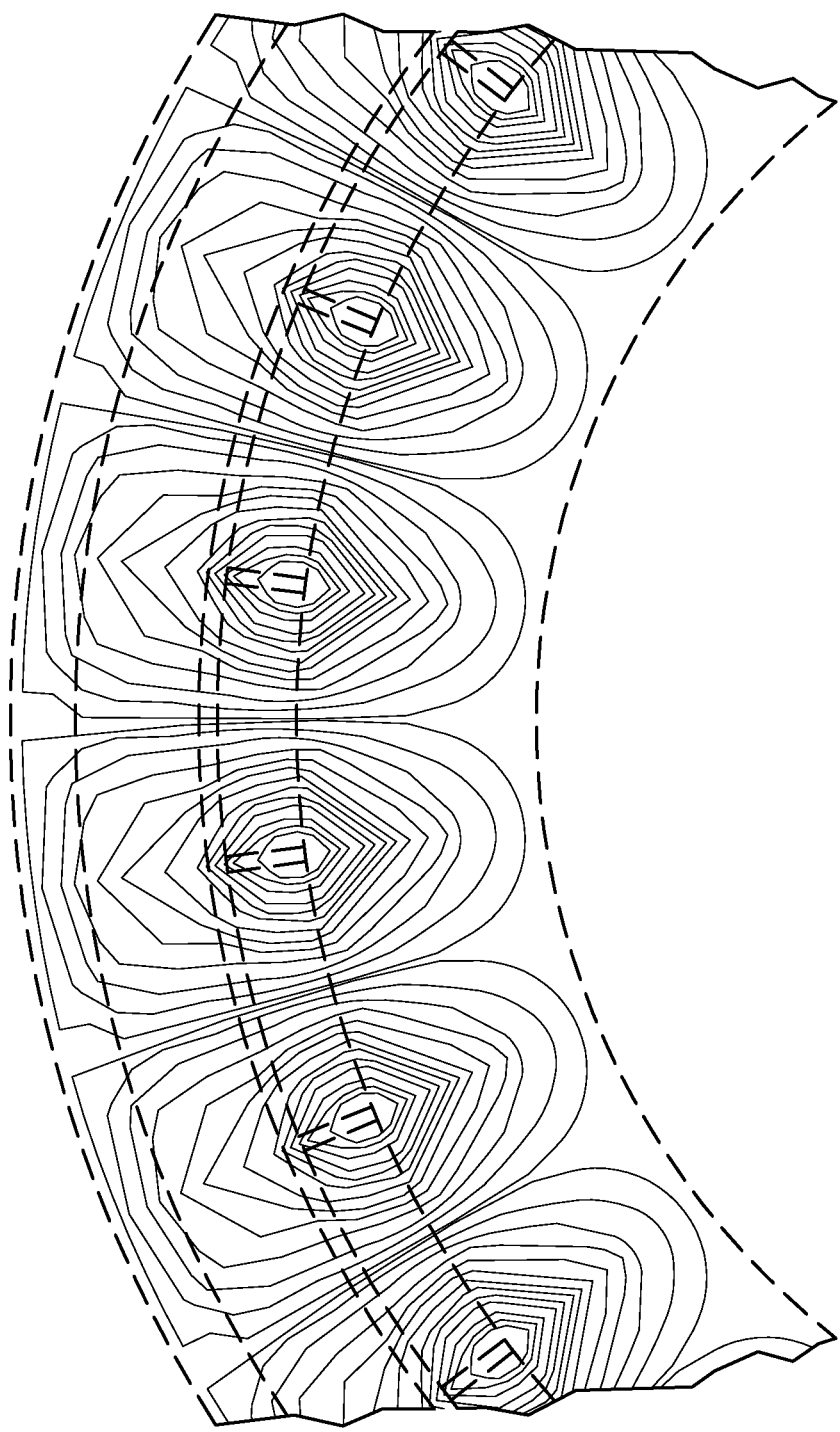
FIG. 7 is a magnetic field simulation of the second alternative de-icing stage.

If the magnetic field flux density in the FIG. 4 embodiment is not strong enough to generate a sufficient amount of heat, the outer member may be modified to comprise an external ferromagnetic ring 250 (FIG. 6) (e.g., of carbon steel) encircling a high electrical/thermal conductivity non-ferromagnetic ring 252. The ferromagnetic ring 250 increases the normal component of the magnetic flux density in the air gap between permanent magnets and the high-conductivity ring 252. The density of induced eddy currents in the high conductivity ring is proportional to the normal component of the magnetic flux density squared. $\mu_R$ values for the ferromagnetic ring 250 and non-ferromagnetic ring 252 may be similar to those given above for ferromagnetic and non-ferromagnetic rings, respectively. Exemplary thickness of the ferromagnetic ring is in the vicinity of 10 mm (e.g., 5-15 mm). Exemplary thickness of the non-ferromagnetic ring 252 is 3-12 mm, more particularly, 4-8 mm. The appropriate thickness for the ferromagnetic ring 250 will be relatively insensitive to operational speed compared with the thickness of the non-ferromagnetic ring 252. For higher speed operation, the non-ferromagnetic ring 252 will become thinner due to skin effect.

Figure 8:
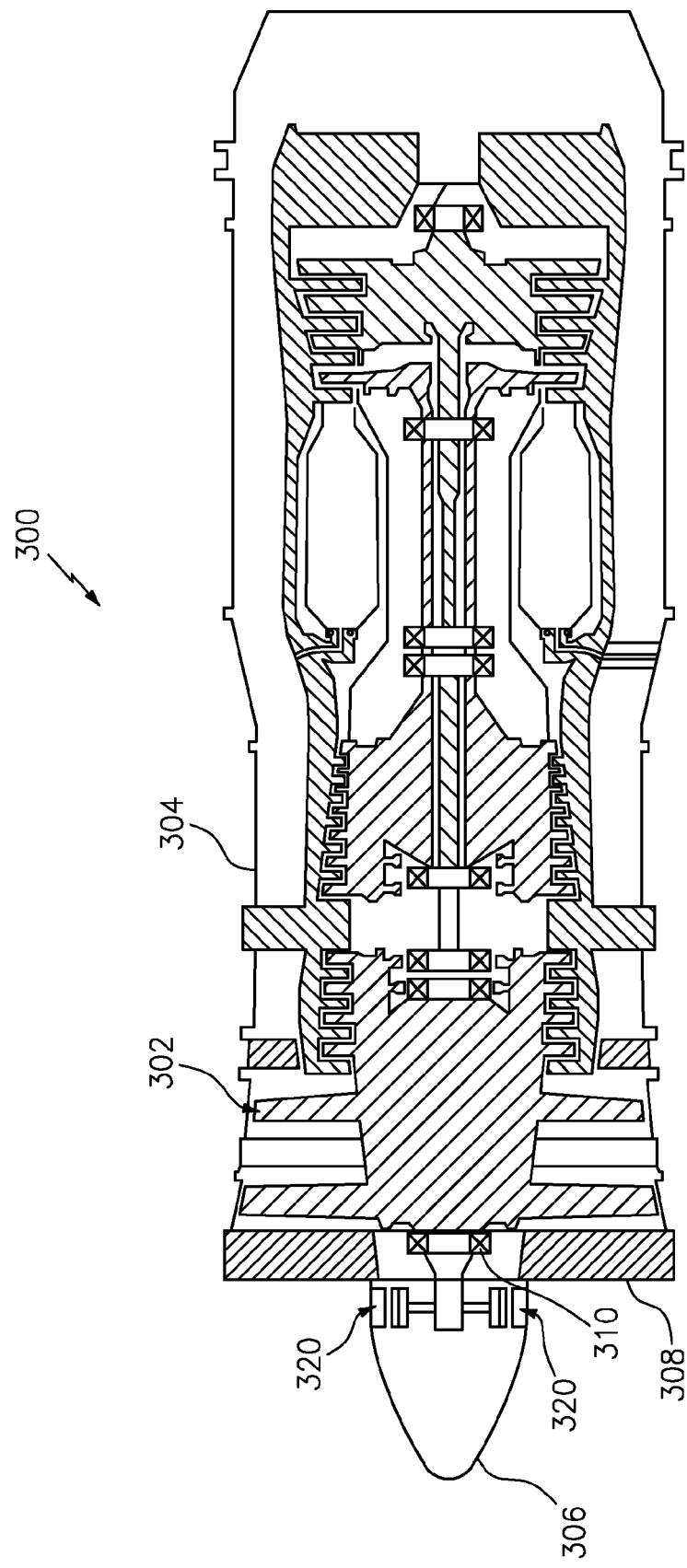
FIG. 8 is a partially schematic longitudinal sectional view of an alternative gas turbine engine.

FIG. 8 shows an alternate gas turbine engine. The exemplary engine 300 is a low-bypass turbofan wherein there is a multi-stage fan 302 and the short localized fan case of the high-bypass turbofan is replaced with a full-length outer case 304. The exemplary fan is driven as a part of the low pressure spool without gear reduction.

In this exemplary engine, the nose cone or hub 306 is held non-rotating via a circumferential array of fan inlet guide vanes 308 (as distinguished from outlet guide vanes). The fan inlet guide vanes are coupled via a bearing system 310 to the low pressure spool to support the low pressure spool. Thus, this example can reverse the rotating versus non-rotating natures of the de-icing system's inner member and outer member relative to those of the foregoing embodiments.

Figure 8A:
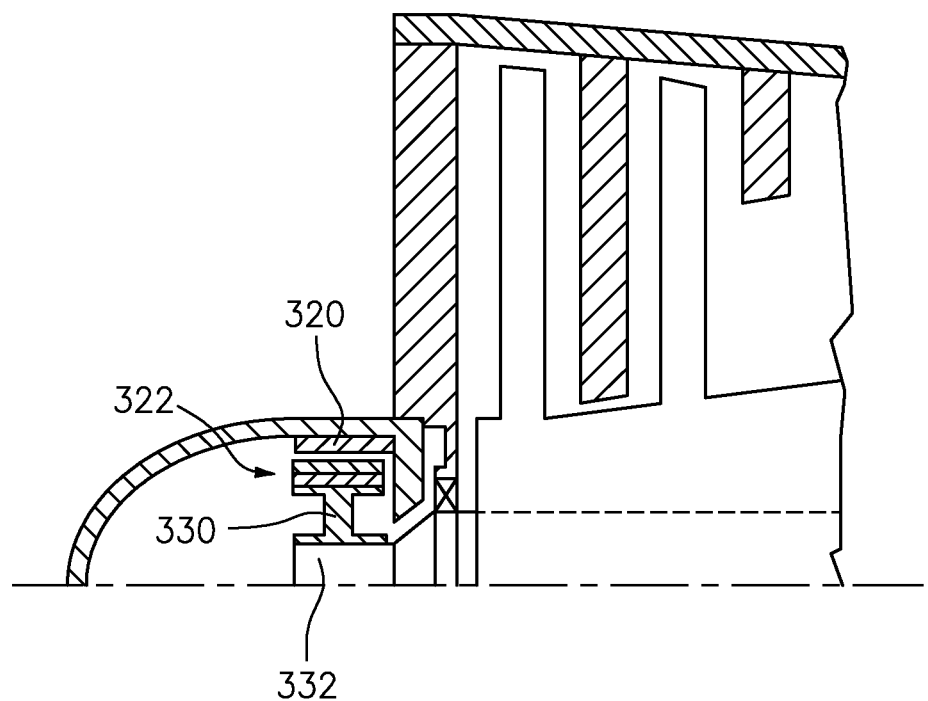
FIG. 8A is an enlarged sectional view of a hub of the engine of FIG. 8.

FIG. 8A shows the de-icing system's outer member 320 which may be otherwise similar to the outer member 86 of FIG. 1A or other outer members discussed above. Similarly, the inner member 322 may be similar to any of the inner members discussed above. The inner member, however, is mounted via a support 330 to a forward portion of the low pressure spool (e.g., a forward end portion 332 of the low pressure shaft). The exemplary support 330 is shown as a wheel-like structure having a web extending radially between an inner sleeve mounted to the shaft and an outer sleeve to which the outer member is mounted. As with the FIG. 1 embodiment, there may be multiple stages of the de-icing system. Additionally, the outer member may be integrated with the cone 306.

One or more embodiments have been described. Nevertheless, it will be understood that various modifications may be made. For example, when implemented as a modification of a baseline engine configuration, details of the baseline may influence details of any particular implementation. Accordingly, other embodiments are within the scope of the following claims.

What is claimed is:

1. A turbomachine comprising:
    a first member being a nose cone or an inlet cone and having an exposed peripheral surface and an electrically and thermally conductive portion, an air flowpath passing over the peripheral surface; and
    a circumferential array of magnets of alternating polarity mounted for rotation about an axis relative to the first member inboard of the peripheral surface, the magnets being in sufficient proximity to the electrically and thermally conductive portions so that the rotation of the magnets about the axis is effective to generate eddy currents, in turn, is effective to heat the electrically and thermally conductive portion and, thereby, heat the exposed peripheral surface.

2. The turbomachine of claim 1 wherein:
    the array is not a portion of an electric motor, electric generator, or magnetic coupling.

3. The turbomachine of claim 1 wherein:
    the array comprises at least 10 cycles of a repeating pattern.

4. The turbomachine of claim 1 wherein:
    the array is counterotationally coupled to the first member via a transmission.

5. The turbomachine of claim 1 wherein:
    the array is a Malinson-Halbach array.

6. The turbomachine of claim 1 wherein the array comprises a repeating pattern of:
    a first magnet of north-outward polarity;
    a second magnet of north-clockwise polarity;
    a third magnet of north-inward polarity; and
    a fourth magnet of north-counterclockwise polarity.

7. The turbomachine of claim 1 wherein the array surrounds and is non-rotationally mounted to a non-ferromagnetic ring.

8. The turbomachine of claim 1 wherein the array comprises a repeating pattern of:
    a first magnet of north-outward polarity; and
    a second magnet of north-inward polarity.

9. The turbomachine of claim 1 wherein the array surrounds and is non-rotationally mounted to a ferromagnetic ring.

10. The turbomachine of claim 9 wherein:
    the ferromagnetic ring has a radial thickness of at least 3 mm.

11. The turbomachine of claim 1 wherein the first member electrically and thermally conductive portion comprises, circumscribing the array:
    a steel ring; and
    a conductive non-ferromagnetic ring inboard of the steel ring.

12. The turbomachine of claim 11 wherein:
    the steel ring has a radial thickness of at least 3 mm.

13. The turbomachine of claim 1 wherein:
    there are a plurality of said circumferential arrays, with a longitudinally-varying diameter.

14. The turbomachine of claim 1 being a turbine engine wherein:
    the first member comprises an engine case and the nose cone or the inlet cone; and
    the first exposed peripheral surface is of the nose cone or the inlet cone.

15. The turbine engine of claim 14 wherein:
    the first member electrically and thermally conductive portion comprises at least one metallic ring mounted along an inner surface of the nose cone or the inlet cone.

16. The turbine engine of claim 14 being a turbofan engine comprising:
    a core flowpath through the engine case;
    a fan having a circumferential array of fan blades; and
    a fan case encircling the fan blades radially outboard of the engine case.

17. A method for operating a turbine engine, the turbine engine comprising:
    a first member having an exposed peripheral surface; and
    a circumferential array of magnets of alternating polarity mounted to rotate relative to the first member inboard of the peripheral surface,
the method comprising:
    driving rotation of the array about the axis relative to the first member, the driving effective to cause the array to magnetically heat the peripheral surface; and
    the driving comprising running the turbine engine to also cause an airflow to pass over the peripheral surface.

18. The method of claim 17 wherein:
    the magnetic heating of the peripheral surface is effective to prevent icing on the peripheral surface.

19. The method of claim 17 wherein:
    the magnetic heating of the peripheral surface is effective to melt ice on the peripheral surface.

\* \* \* \* \*